(12) United States Patent
Brum

(10) Patent No.: US 6,510,798 B2
(45) Date of Patent: Jan. 28, 2003

(54) PACKAGING METHOD FOR INFRARED SPECIAL MATERIAL

(75) Inventor: Roger D. Brum, Irvine, CA (US)

(73) Assignee: Meggitt Defense Systems, Tustin, CA (US)

(*) Notice: Subject to any disclaimer, the term of this patent is extended or adjusted under 35 U.S.C. 154(b) by 0 days.

(21) Appl. No.: 10/120,176

(22) Filed: Apr. 10, 2002

(65) Prior Publication Data

US 2002/0117073 A1 Aug. 29, 2002

Related U.S. Application Data

(62) Division of application No. 09/792,516, filed on Feb. 23, 2001.

(51) Int. Cl.[7] .................................................. F42B 8/00
(52) U.S. Cl. ....................................................... 102/505
(58) Field of Search ................................. 102/501, 502, 102/503, 505, 336, 338, 342

(56) References Cited

U.S. PATENT DOCUMENTS

| | | | |
|---|---|---|---|
| 2,381,130 A | | 8/1945 | Lloyd |
| 2,448,343 A | | 8/1948 | Zandmer |
| 2,551,596 A | | 5/1951 | Haglund |
| 2,813,719 A | | 11/1957 | Hopper |
| 2,907,536 A | | 10/1959 | Zborowski |
| 2,923,549 A | | 2/1960 | Hopper et al. |
| 2,953,377 A | | 9/1960 | Brust |
| 2,998,754 A | | 9/1961 | Bialy |
| 3,002,708 A | | 10/1961 | Wetzel et al. |
| 3,095,814 A | * | 7/1963 | Jansen et al. ............... 102/377 |
| 3,135,511 A | | 6/1964 | Norman et al. |
| 3,225,655 A | | 12/1965 | Inglis |
| 3,505,926 A | | 4/1970 | Johnson |
| 3,610,096 A | | 10/1971 | Bauman et al. |
| 3,808,941 A | * | 5/1974 | Biggs ........................ 89/1.51 |
| 3,871,321 A | | 3/1975 | Giebel et al. |
| 3,898,661 A | * | 8/1975 | Kelly et al. ................. 102/505 |
| 4,062,112 A | | 12/1977 | Lake |
| 4,205,848 A | | 6/1980 | Smith et al. |
| 4,607,849 A | | 8/1986 | Smith et al. |
| 4,621,579 A | * | 11/1986 | Badura et al. ............... 102/334 |
| 4,718,320 A | | 1/1988 | Brum |
| 4,770,368 A | | 9/1988 | Yates et al. |
| 4,852,455 A | | 8/1989 | Brum |
| 5,445,078 A | * | 8/1995 | Marion ........................ 102/334 |
| 5,915,694 A | * | 6/1999 | Brum ........................... 102/501 |
| 6,055,909 A | * | 5/2000 | Sweeny ....................... 102/336 |

FOREIGN PATENT DOCUMENTS

| | | |
|---|---|---|
| DE | 1229397 | 11/1966 |
| FR | 1336769 | 7/1963 |

OTHER PUBLICATIONS

Defense Electronics; Oct. 1986; Expendable Decoys Counter Missles with New Technology; Marc Liebman *.

* cited by examiner

*Primary Examiner*—Michael J. Carone
*Assistant Examiner*—Troy Chambers
(74) *Attorney, Agent, or Firm*—Stetina Brunda Garred & Brucker

(57) ABSTRACT

A method of packaging a multiplicity of infrared decoy foils into a canister having an aft end and a drive screw extending therein. The present method allows for the controlled dispensing and dispersal of the decoy foils from within the canister and comprises the initial step of assembling the decoy foils into at least one stack. The stack is advanced into the canister, with a preload being applied to at least a portion of the stack through the use of at least one separator plate cooperatively engaged to the drive screw. The preload applied to the decoy foils is of a force greater than or equal to that required to dispense the decoy foils from the canister.

16 Claims, 3 Drawing Sheets

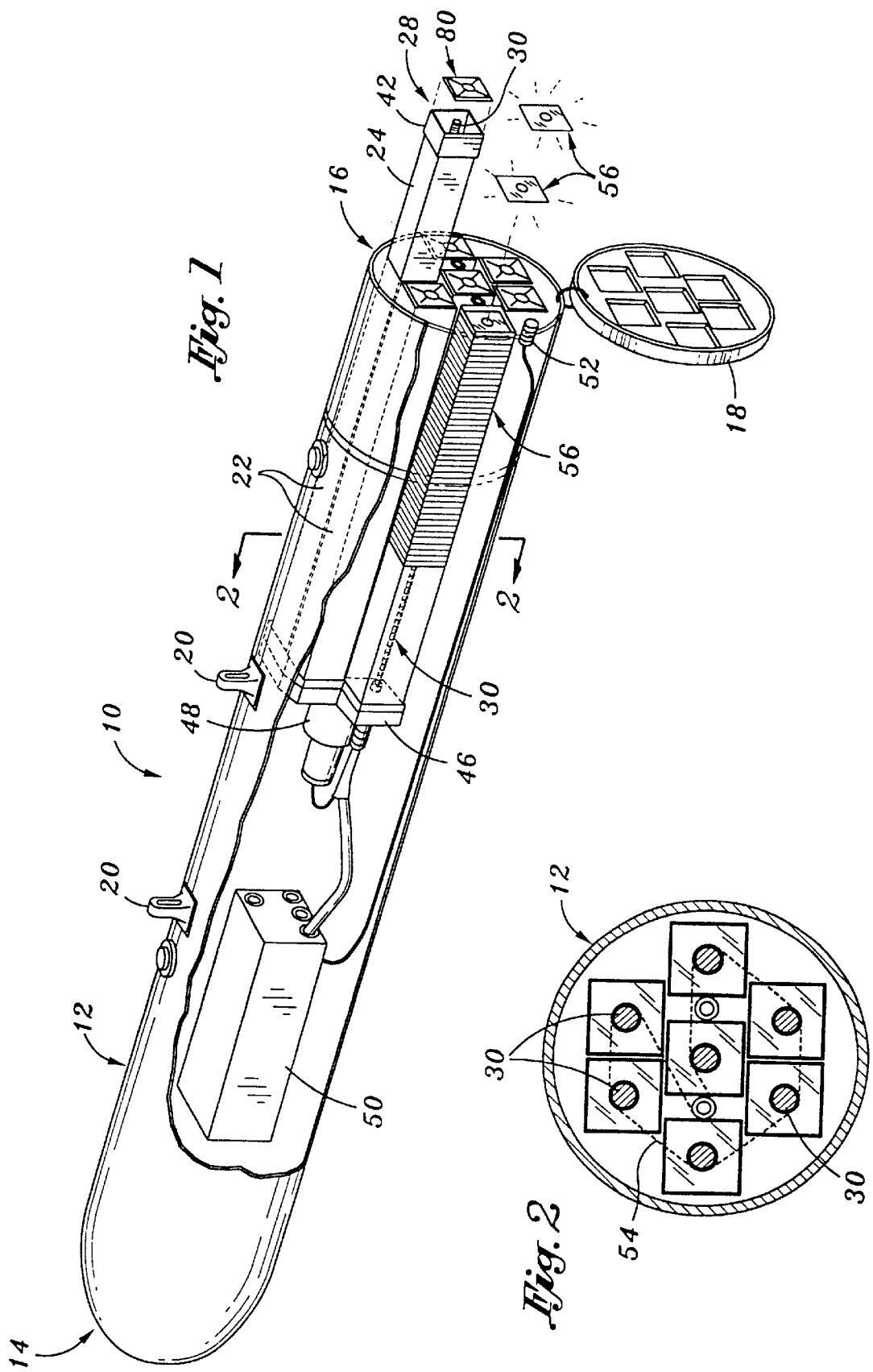

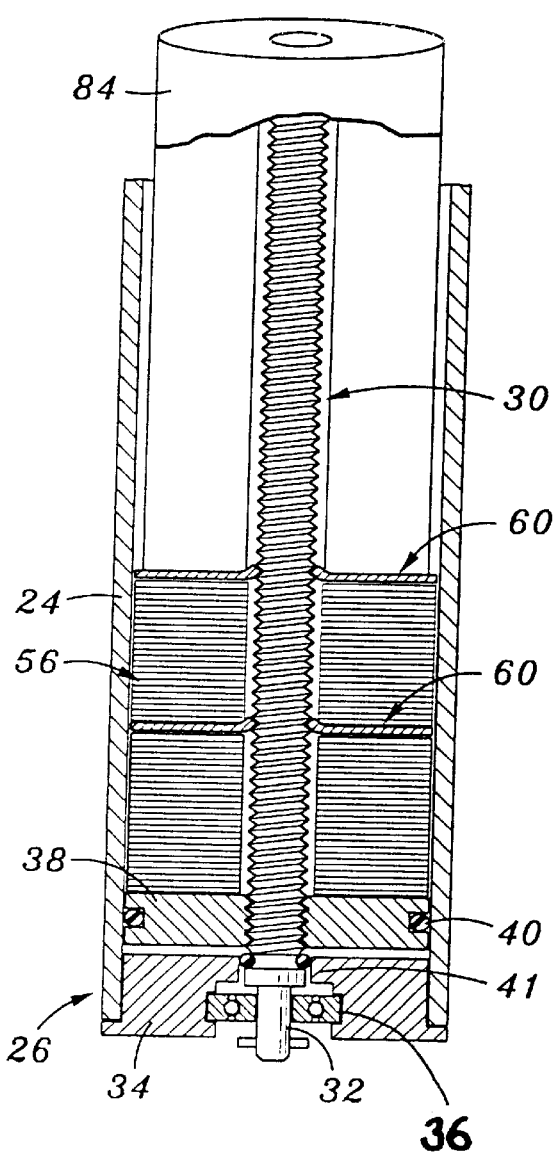
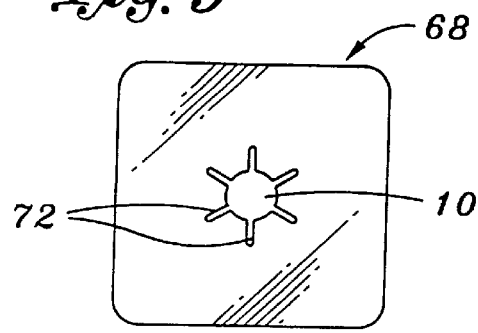
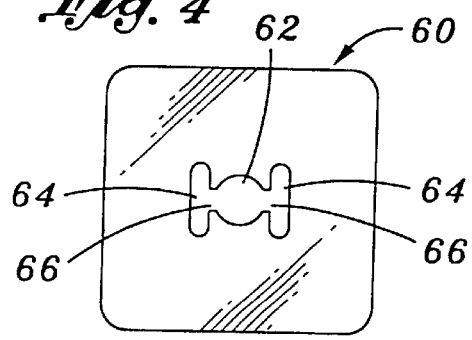
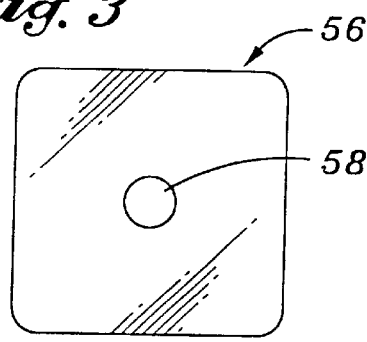
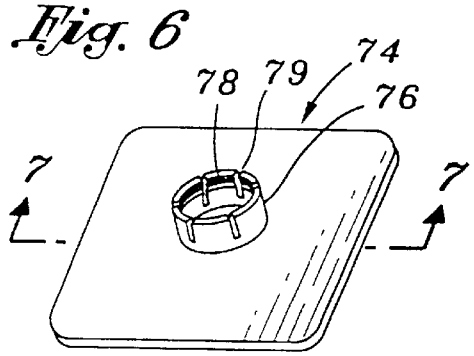
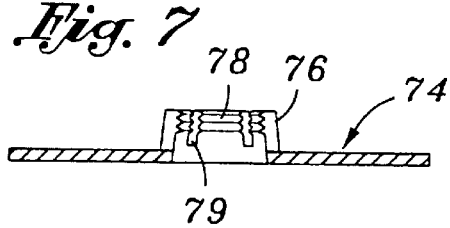

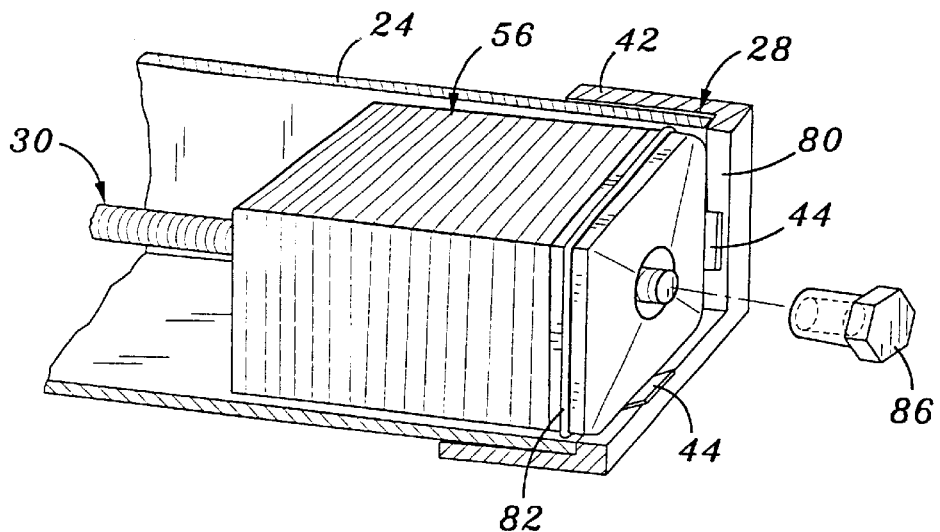
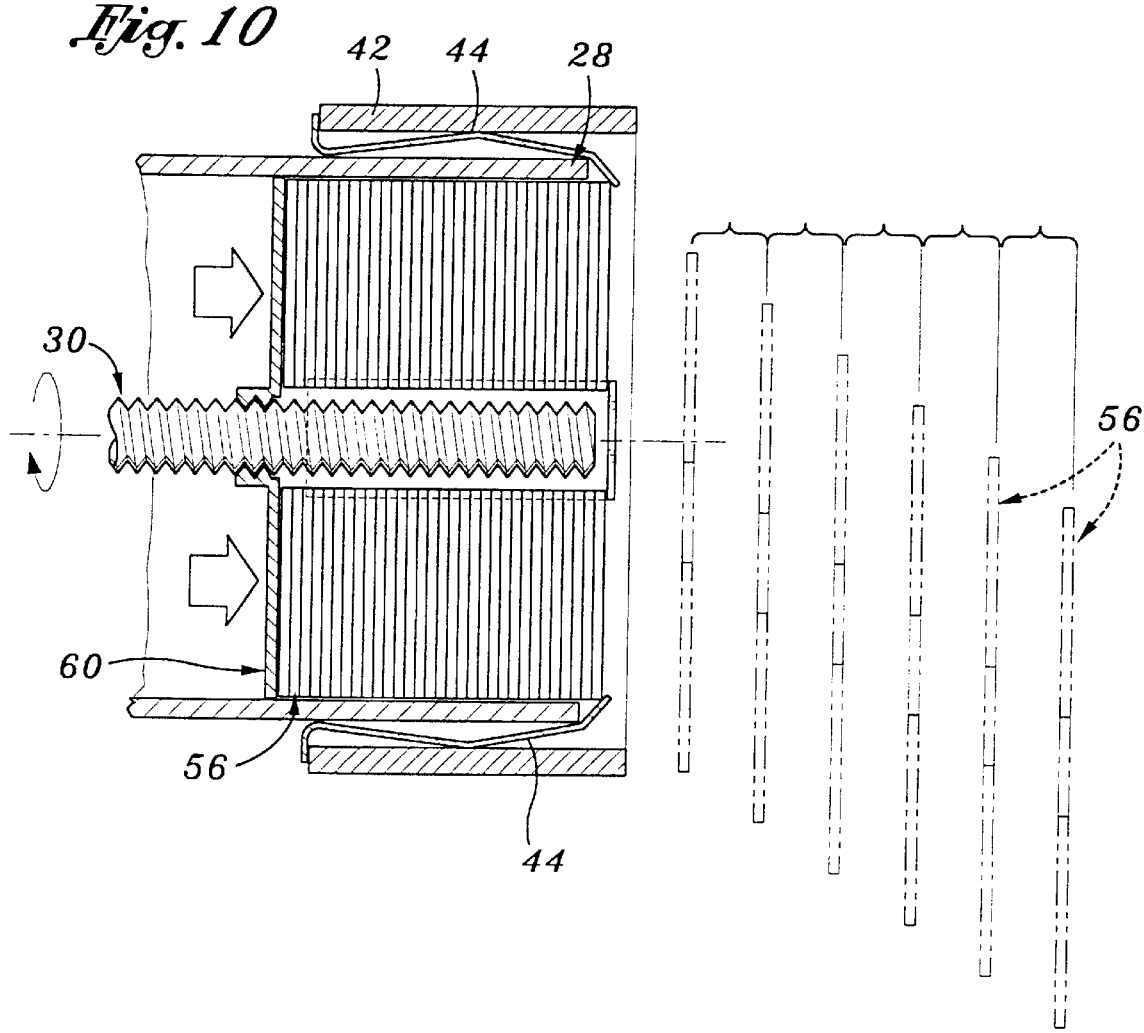

PACKAGING METHOD FOR INFRARED SPECIAL MATERIAL

This application is a divisional application of U.S. patent application Ser. No. 09/792,516, filed Feb. 23, 2001.

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to expendable decoys, and more particularly to a method for packaging infrared decoy foils within a canister which allows for controlled dispensing and dispersal of the foils. The infrared foils are typically a Special Material (SM) which, when brought into contact with air, become warm and radiate infrared energy.

As is well known in the prior art, military aircraft are typically provided with decoys which are used to draw various types of guided weapons away from the aircraft. One of the most commonly used decoy devices is a flare which is adapted to attract infrared or heat seeking guided missiles away from the deploying aircraft. In this respect, the flare is designed to present a larger thermal target than the aircraft from which it is deployed, thus attracting the weapon away from the aircraft.

Over recent years, flares have become decreasingly effective as decoy devices due to anti-aircraft weaponry having become more sophisticated and provided with enhanced capabilities to discriminate between flares and the deploying aircraft. In this respect, modern heat seeking missiles are typically provided with both a frequency discriminator which is adapted to sense the intensity of the infrared signature of the aircraft and a kinetic discriminator which is adapted to sense the speed and trajectory at which the infrared signature is traveling. When a conventional flare is deployed from the aircraft, the infrared signature produced thereby is typically more intense in the near visible frequency range than that produced by the engines of the aircraft, with the velocity and trajectory of the flare being significantly different than that of the deploying aircraft since the flare, once deployed, slows rapidly and falls straight toward the ground. The frequency discriminator of the guided missile is adapted to distinguish between the infrared signature produced by the flare and that produced by the engines of the aircraft. Additionally, the kinetic discriminator of the guided missile is adapted to distinguish between the velocity and trajectory of the aircraft and that of the flare, even if the frequency discriminator does not distinguish the infrared signatures produced thereby. As such, the combined functionality of the frequency and kinetic discriminators of the guided missile typically succeeds in causing the guided missile to disregard the deployed flare, and continue to target the aircraft.

In addition, the principal problem associated with current decoy systems is that an aircraft can only carry a limited number of them. There are not enough to allow for continuous dispensing of decoys. Therefore, the aircraft must be equipped with detectors that warn of a missile's approach such that decoys may be dispensed. With the missile flight time very short, there is insufficient time to react in all situations. Further, such missile warning detectors are not always reliable.

In view of the above-described shortcomings of conventional flares, there exists a need in the art for a system which is adapted to create an infrared signature which is similar in magnitude or intensity to that produced by aircraft engines, appears to travel at a velocity and trajectory commensurate to that of the aircraft, and can provide continuous protection while the aircraft is over threat territory.

Prior art has developed methods of dispensing limited amounts of SM foils from aircraft. This has been done by means of stacking SM foils in a canister and ejecting them all at once using an explosive charge. The principle disadvantage of such an approach is that it provides only momentary protection since it produces one intense cloud, which does not follow the aircraft.

A preferred method is to deploy the SM foils in small packets or continuously from a canister using a drive screw or similar device. This has been accomplished successfully for relatively short stacks of SM foils by means of a piston driven by a lead screw. It has also been accomplished by packaging the SM foils into small packets, which engage a drive belt that drives them out of the canister. These methods dispense the SM foils approximately continuously such that the infrared cloud produced thereby appears to match the aircraft kinematics. They are capable of dispensing over a longer time period offering many seconds of continuous protection.

In order to provide protection for an extended period of time, it is desirable to package the SM foils into canisters which are much longer. While this can be accomplished by means of engaging individual packets of SM foils to a drive belt as described above, the method is more mechanically complex, less volume efficient and allows less flexibility in how the SM foils are dispensed than does a canister with a piston/lead screw.

Using prior art methods, problems are encountered by deploying long columns of SM foils from a piston/lead screw canister. Such canisters are typically comprised of a hollow tube with a piston at one end, and spring fingers at the other. The SM foil stack is located between the piston and spring fingers. The purpose of the spring fingers is to retain the SM foils until such time as they are forced out of the canister by the piston. The stack of SM foils has a great deal of compliance. Since none of the foils are perfectly flat, the column acts as a long spring. As the piston drives the SM foils out, the SM stack compresses against the spring fingers until they are finally let go, at which time a large slug of the SM foils is dispensed. This effect is minimal for short stacks of SM foils but prevents controlled and uniform dispensing of long stacks of SM foils.

The present invention will describe a method and related apparatus for packaging SM foils into long canisters that will allow for controlled and even dispensing therefrom.

BRIEF SUMMARY OF THE INVENTION

In accordance with the present invention, there is provided a decoy pod comprising at least one elongate, tubular canister which defines a forward end and an aft end. The canister preferably has a generally square cross-sectional configuration, and defines a canister axis. Extending within the canister along the canister axis is an elongate, rotatable drive screw which includes a drive screw thread and defines a root diameter. Threadably engaged to the drive screw is a piston which is disposed adjacent the forward end of the canister. The threadable engagement between the drive screw and the piston is such that the rotation of the drive screw will facilitate the movement of the piston along the canister axis toward the aft end of the canister.

The decoy pod further comprises multiple stacks of SM decoy foils which are disposed within the canister. The decoy foils each have a generally square configuration, and are each provided with a pre-cut clearance hole within the approximate center thereof. Each stack of the decoy foils is preferably formed to have a height in the range of from about 0.5 inches to about 8.0 inches, and most preferably in the range of from about 1.0 inches to about 3.0 inches. The hole within each decoy foil is sized to allow the drive screw to easily pass therethrough.

The decoy pod of the present invention further comprises multiple separator plates which are each cooperatively engaged to the drive screw and disposed between an adjacent pair of the stacks of the decoy foils loaded into the canister. The separator plates are operative to apply a preload to respective ones of the stacks. In this respect, after each stack of the decoy foils is loaded into the interior of the canister, a separator plate is installed on top of the just loaded stack. The separator plates each have approximately the same form as the decoy foils, i.e., a thin, generally square configuration. Additionally, each of the separator plates is formed to include at least one hole in the approximate center thereof which is sized and configured to allow each of the separator plates to be pushed over and along the drive screw without the need to rotate the drive screw. More particularly, the hole of each separator plate is preferably sized to have a diameter which is slightly smaller than the root diameter of the drive screw. Additionally, each separator plate is preferably formed to include a pair of elongate primary slots which extend in generally parallel relation to each other along opposed sides of the hole. In addition to the primary slots, a pair of secondary slots are formed in each separator plate which extend radially from the hole to respective ones of the primary slots. The primary and secondary slots of each separator plate are sized and configured to allow the hole to expand around the drive screw when pushed thereover, and to cause the separator plate to engage the drive screw in a manner resisting the opposing pressure produced by the preloaded decoy foils.

In an alternative embodiment, each of the separator plates may be formed to include multiple slots which extend radially from the hole thereof, and are sized and configured to allow the hole to expand around the drive screw when pushed thereover, and to cause the separator plate to engage the drive screw in a manner resisting the opposing pressure produced by the preloaded decoy foils. In a further alternative embodiment, the hole within each of the separator plates may be internally threaded so as to be threadably engageable to the drive screw threads of the drive screw by producing relative rotation between the drive screw and the separator plate. As will be recognized, the primary and secondary slots and radial slots described above allow the hole of the corresponding separator plate to expand when forced over the drive screw, and more particularly the drive screw threads thereof.

The decoy pod of the present invention further comprises an end closure which is cooperatively engaged (i.e., threadably connected) to the drive screw and operative to apply a preload to the last loaded stack of decoy foils, i.e., the stack disposed closest to the aft end of the canister. The end closure preferably includes a sealing member which extends about the peripheral edge thereof and is disposed in sealed engagement to the interior surface of the canister. Additionally, at least two and preferably four spring fingers separated by intervals of approximately 90 degrees are preferably cooperatively engaged to the canister at the aft end thereof. As indicated above, in the present decoy pod, each separator plate is installed over the drive screw and preloaded onto the stack of decoy foils beneath it. The preload applied to each stack by its corresponding separator plate is preferably greater than or equal to the force required to push the decoy foils through the spring fingers located at the open aft end of the canister. In this respect, the stacks of decoy foils are pre-compressed by the separator plates and act as a rigid, incompressible column, thus providing for the controlled and even dispensation of the decoy foils from within the canister. As a result, the decoy foils of the present invention may be packaged into canisters which are much longer than was possible using the prior art.

As indicated above, the rotation of the drive screw in the present decoy pod is operative to facilitate the movement of the piston along the drive screw toward the aft end of the canister. Since the stacks of the decoy foils and the separator plates are disposed between the piston and the aft end of the canister (and more particularly the end closure), the movement of the piston toward the aft end results in the dispensation of the decoy foils therefrom. As will be recognized, the initiation of the rotation of the drive screw causes the end closure to be initially jettisoned from the decoy pod, with the decoy foils thereafter being dispensed therefrom stack by stack. As indicated above, the preferred sizing of the stacks and preloading thereof by the separator plates causes the decoy foils to be evenly and uniformly dispensed through the spring fingers located at the aft or exit end of the canister. Advantageously, the preferred size of the canister makes it capable of holding a sufficient quantity of the decoy foils to offer approximately five (5) minutes of continuous protection. A plurality of these canisters (typically six and preferably seven) can be installed within the interior of the decoy pod or upon another location of the aircraft. The decoy foils can then be expended or dispensed sequentially from the canisters, thus offering thirty (30) minutes or more of continuous protection from infrared guided missiles.

Further in accordance with the present invention, there is provided a method of packaging a multiplicity of infrared decoyed foils into a canister having an aft end and a drive screw extending therein. The present method allows for the controlled dispensing and dispersal of the decoyed foils from the canister, and comprises the initial step of segregating the decoy foils into multiple stacks. The stacks are than advanced one at a time into the interior of the canister, with a preload then being applied to each of the stacks other than for the stack disposed closest to the aft end of the canister through the use of multiple separator plates which are cooperatively engaged to the drive screw such that each of the separator plates is disposed between an adjacent pair of the stacks. The present method further comprises the step of applying a preload to the stack disposed closest to the aft end of the canister through the use of an end closure cooperatively engaged to the drive screw. The cooperative engagement of the separator plates to the drive screw is preferably accomplished by pushing the separator plates over the drive screw without rotating the same. Alternatively, the separator plates may be threadably engaged to the drive screw by producing relative rotation therebetween.

Thus, the present invention provides a packaging method for infrared decoy foils within the canister which allows for the controlled dispensing and dispersal of the decoy foils therefrom. As indicated above, the decoy pod of the present invention comprises a canister and a drive screw which engages the internal piston and end closure, and extends to an external engagement fitting. The rotation of the drive screw releases the end closure and causes the piston to drive the foils out from within the interior of the canister, and hence from within the decoy pod. The even dispensing of the decoy foils is assured by the multiple separator plates which are located at intervals within the decoy foils, and engage the drive screw in a manner facilitating the application of the preload to the decoy foils.

BRIEF DESCRIPTION OF THE DRAWINGS

These, as well as other features of the present invention, will become more apparent upon reference to the drawings wherein:

FIG. 1 is a perspective view of a decoy pod constructed in accordance with the present invention, illustrating the manner in which multiple decoy foil filled canisters are oriented therewithin;

FIG. 2 is a cross-sectional view taken along line 2—2 of FIG. 1;

FIG. 3 is a front elevational view of one of the decoy foils included in the present decoy pod;

FIG. 4 is a front elevational view of a preferred separator plate used in the present decoy pod;

FIG. 5 is a front elevational view of a first alternative embodiment of a separator plate which may be used in the present decoy pod;

FIG. 6 is a perspective view of a second alternative embodiment of a separator plate which may be used in the present decoy pod;

FIG. 7 is a cross-sectional view of the separator plate shown in FIG. 6, taken along line 7—7 thereof;

FIG. 8 is a partial cross-sectional view of one of the canisters of the present decoy pod, illustrating the piston, drive screw, decoy foil stacks and separator plates disposed within the canister;

FIG. 9 is a perspective cut-away view of the aft end of one of the canisters within the present decoy pod, illustrating the engagement of the end closure to the drive screw extending within the canister; and FIG. 10 is a partial cross-sectional view of one of the canisters of the present decoy pod, illustrating the manner in which decoy foils are dispensed through the spring fingers at the aft end of the canister.

DETAILED DESCRIPTION OF THE INVENTION

Referring now to the drawings wherein the showings are for purposes of illustrating preferred embodiments of the present invention only, and not for purposes of limiting the same, FIG. 1 perspectively illustrates a decoy pod 10 constructed in accordance with the present invention. The decoy pod 10 comprises an elongate, tubular housing 12 which defines a closed forward end 14 and an open aft end 16. Attached to the housing 12 is a bezel plate 18 which is movable between an open position (shown in FIG. 1) and a closed position. When in the closed position, the bezel plate 18 encloses or covers the open aft end 16 of the housing 12. Attached to the housing 12 in aligned, spaced relation to each other is a pair of engagement members 20 which are used to facilitate the attachment of the decoy pod 10 to a prescribed location on an aircraft.

Disposed within the interior of the housing 12 are a plurality of elongate, tubular guide tubes 22 which extend in generally parallel relation to each other. As seen in FIG. 1, the guide tubes 22 each have a generally square cross-sectional configuration, and extend to the aft end 16 of the housing 12.

Referring now to FIGS. 1 and 8–10, the decoy pod 10 of the present invention further comprises a plurality of elongate, tubular canisters 24 which are slidably advanceable into respective ones of the guide tubes 22. In this respect, the canisters 24 themselves each preferably have generally square cross-sectional configurations which are complimentary to those of the guide tubes 22. The width of each canister 24 is preferably about 2.25 inches, with the width of each guide tube 22 preferably being about 2.30 inches. Though seven guide tubes 22 and thus seven canisters 24 are preferably included in the decoy pod 10, those of ordinary skill in the art will recognize that fewer or more than seven guide tubes 22 and canisters 24 may be disposed within the interior of the housing 12.

Each canister 24 of the decoy pod 10 defines a forward end 26 (shown in FIG. 8), an aft end 28 (shown in FIGS. 9 and 10), and a central canister axis. Extending within each canister 24 along the canister axis thereof is an elongate, rotatable drive screw 30 which includes a drive screw thread and defines a root diameter. As is most apparent from FIGS. 8 and 10, one end of the drive screw 30 extends to approximately the aft end 28 of the corresponding canister 24, with the opposite end of the drive screw 30 extending slightly beyond the forward end 26 of the canister 24. As best seen in FIG. 8, the end of the drive screw 30 disposed closest to the forward end 26 defines a reduced diameter coupling portion 32, the use of which will be described in more detail below.

As further seen in FIG. 8, attached to the forward end 26 of each canister 24 is a bulkhead 34. The bulkhead 34 defines a central opening which allows for the passage of the coupling portion 32 of the drive screw 30 into the interior thereof. Disposed within the central opening of the bulkhead 34 is a bearing 36 which extends about the coupling portion 32 of the drive screw 30 and rotatably supports the same. Threadably engaged to the drive screw 30 is a piston 38 which is disposed immediately adjacent the bulkhead 34. Disposed within the bulkhead 34 and about the coupling 32 is a sealing member 41 which is disposed in sealed engagement between the bulkhead 34 and the drive screw 30. The threadable engagement between the drive screw 30 and the piston 38 is such that the rotation of the drive screw 30 will facilitate the movement of the piston 38 along the canister axis toward the aft end 28 of the canister 24. Disposed within the piston 38, preferably at the center of each side, is a magnet 40. The magnet 40 serves to activate the sensor 52 (FIG. 1) when the piston 38 has traveled fully to the end of the canister 24 described below, indicating that it has expended all decoy foils 56. That information is provided to a control unit 50 which then may commence dispensing from another canister 24.

Referring now to FIGS. 9 and 10, attached to the aft end 28 of each canister 24 is an end flange 42. The end flange 42 is operative to maintain four spring fingers 44 in cooperative engagement to the aft end 28 of the canister 24. The spring fingers 44 are preferably separated from each other by intervals of approximately ninety degrees, i.e., each spring finger 44 is disposed at the approximate center of a respective one of the four sides of the canister 24. However, those of ordinary skill in the art will recognize that each canister 24 may be provided with only two spring fingers 44 disposed in opposed relation to each other. The use of the spring fingers 44 will be described in more detail below.

Referring now to FIGS. 1 and 2, attached to the forward ends of the guide tubes 22 is a common transmission housing 46. Mechanically coupled to the transmission housing 46 is a drive motor 48. The transmission housing 46 and drive motor 48 are in electrical communication with the control unit 50 which is disposed within the interior of the housing 12 toward the forward end 14 thereof. Also in electrical communication with the control unit 50 is a sensor 52 which is disposed at the aft end 16 of the housing 12 and is used for reasons which will be described in more detail below. Disposed within the transmission housing 46 are seven separate magnetic clutches which are disposed within the approximate centers of the forward ends of respective ones of the guide tubes 22. In the decoy pod 10, the canisters 24 are advanced into respective ones of the guide tubes 22 such that the coupling portions 32 of the drive screws 30 are mechanically coupled to respective ones of the magnetic clutches. Advantageously, the internal configuration of the transmission housing 46 and inclusion of the magnetic clutches therein allows the single drive motor 48 to selectively rotate the drive screws 30 one at a time via a common drive chain 54. As will be discussed in more detail below, the sequence or order in which the drive screws 30 are rotated by the drive motor 48 is dictated by the control unit 50.

Disposed within each canister 24 of the decoy pod 10 are multiple stacks of SM (infrared Special Material) decoy foils 56. As seen in FIG. 3, the decoy foils 56 each have a generally square configuration which is complimentary to the interior of the canister 24, and are each provided with a pre-cut, circularly configured clearance hole 58 in the approximate center thereof. The hole 58 within each decoy foil 56 is sized to allow the drive screw 30 of the corresponding canister 24 to easily pass therethrough. Each stack of the decoy foils 56 disposed within the interior of the canister 24 is preferably formed to have a height in the range from about 0.5 inches to about 8.0 inches, and most preferably in the range from about 1.0 inches to about 3.0 inches.

In addition to the multiple stacks of decoy foils 56, also disposed within the interior of each canister 24 of the decoy pod 10 are multiple identically configured separator plates 60 which are each cooperatively engaged to the drive screw 30. As is best seen in FIG. 8, each of the separator plates 60 is disposed between an adjacent pair of the stacks of the decoy foils 56 loaded into the canister 24. Additionally, the separator plates 60 are operative to apply a preload to respective ones of the stacks of decoy foils 56. In this respect, after each stack of the decoy foils 56 is loaded into the interior of the canister 24, a separator plate 60 is installed on top of the just loaded stack.

Referring now to FIG. 4, the separator plates 60 each have approximately the same form as the decoy foils 56, i.e, a generally square configuration which is complimentary to the interior of the canister 24. Additionally, each of the separator plates 60 is preferably formed to include at least one hole 62 in the approximate center thereof. The hole 62 is sized and configured to allow the separator plate 60 to be pushed over and along the drive screw 30 of the corresponding canister 24 without the need to rotate the drive screw 30. More particularly, the hole 62 of each separator plate 60 is preferably sized to have a diameter which is slightly smaller than the root diameter of the drive screw 30. Additionally, each separator plate 60 is preferably formed to include a pair of elongate primary slots 64 which extend in generally parallel relation to each other along opposed sides of the corresponding hole 62. In addition to the primary slots 64, a pair of secondary slots 66 are formed in each separator plate 60 and extend radially from the hole 62 to respective ones of the primary slots 64. The primary and secondary slots 64, 66 of each separator plate 60 are sized and configured to allow the hole 62 to expand around the drive screw 30 when pushed thereover, and to cause the separator plate 60 to engage the drive screw 30 in a manner resisting the opposing pressure produced by the preloaded decoy foils 56.

Referring now to FIG. 5, there is depicted a separator plate 68 which may be used in the canister 24 as an alternative to the above-described separator plate 60. The separator plate 68, like the separator plate 60, includes a circularly configured hole 70 in the approximate center thereof. In addition to the hole 70, the separator plate 68 includes multiple slots 72 which extend radially from the hole 70 and are spaced from each other in equidistant intervals of approximately sixty degrees. The slots 72 are also sized and configured to allow the hole 70 to expand around the drive screw 30 when pushed thereover, and to cause the separator plate 68 to engage the drive screw 30 in a manner resisting the opposing pressure produced by the preloaded decoy foils 56.

FIGS. 6 and 7 illustrate a separator plate 74 which may be used in the canister 24 as an alternative to either the separator plates 60, 68. Like the separator plates 60, 68, the separator plate 74 has a generally square configuration, which is complimentary to that of the canister 24. The separator plate 74 would preferably be fabricated or molded from a somewhat compliant material such as plastic. The separator plate 74 is also provided with a generally cylindrical protrusion 76 in its approximate center. The protrusion 76 has internal threads 78 located at the opposite end from the flange. The protrusion 76 is relieved with multiple slots 79 which allow threads 78 to expand in a radial outward direction when the separator plate 74 is pushed over drive screw 30. It can be appreciated that pressure applied by the decoy foils 56 from the non-protrusion side of the separator plate 74 will cause the threads 78 to firmly engage the drive screw threads 30.

Referring now to FIG. 9, in addition to the piston 38, cooperatively engaged to each drive screw 30 is an end closure 80 which is operative to apply a preload to the last loaded stack of decoy foils 56, i.e., the stack of decoy foils 56 disposed closest to the aft end 28 of the corresponding canister 24. An internally threaded end nut 86 is threadably engaged to the drive screw 30 and, when tightened, acts against the end closure 80 in a manner causing the preload to be applied to the last loaded stack of decoy foils 56 by the end closure 80. The end nut 86 preferably includes a sealant adhesive applied thereto which creates a seal with the end closure 80 as prevents the flow or migration of air to the decoy foils 56 prior to the ejection of the end closure 80 from the canister 24 as will be discussed in more detail below. The end closure 80 itself has a generally square configuration which is complimentary to that of the interior of the canister 24. Additionally, the end closure 80, like the piston 38, preferably includes a sealing member 82 which extends about the peripheral edge thereof and is disposed in sealed engagement to the interior surface of the canister 24. Thus, in the fully loaded canister 24, the stacks of decoy foils 56 and intervening separator plates 60 extend between the piston 38 and the end closure 80. Importantly, the sealing members 40, 82 and nut 86 prevent airflow to the decoy foils 56 within the stacks as is needed to prevent the same from being prematurely activated.

As indicated above, within each canister 24 of the decoy pod 10, the separator plates. 60 are installed over the drive screw 30, with each separator plate 60 being preloaded onto the stack of decoy foils 56 beneath it. Such preloading is preferably accomplished through the use of a ram 84, a portion of which is shown in FIG. 8. The first loaded stack of decoy foils 56 within the canister 24 is placed into abutting contact with the piston 38, with the second loaded stack of decoy foils 56 being abutted against the first loaded separator plate 60. As indicated above, the last loaded stack of decoy foils 56 is abutted against the last loaded separator plate 60, with the preload being applied to the last loaded stack of decoy foils 56 via the end closure 80.

In the present decoy pod 10, the preload applied to each stack of the decoy foils 56 by its corresponding separator plate 60 or by the end closure 80 is preferably greater than or equal to the force required to push the decoy foils 56 through the spring fingers 44 located at the open aft end 28 of the canister 24. In this respect, the stacks of decoy foils 56 are pre-compressed by the separator plates 60 and act as rigid, incompressible column, thus providing for the controlled and even dispensation of the decoy foils 56 from within the canister 24. As a result, the canisters 24 into which the decoy foils 56 are packaged are much longer than those known in the prior art.

As indicated above, the rotation of each drive screw 30 in the present decoy pod 10 is operative to facilitate the movement of the corresponding piston 38 along the drive screw 30 toward the aft end 28 of the canister 24. Since the stacks of the decoy foils 56 and intervening separator plates 60 are disposed between the piston 38 and the end closure 80, the movement of the piston 38 toward the aft end 28 results in the dispensation of the decoy foils 56 (as well as the separator plates 60) therefrom. As will be recognized, the initiation of the rotation of the drive screw 30 causes the end closure 80 to be initially jettisoned from the canister 24, with the decoy foils 56 thereafter being dispensed therefrom stack by stack. The preferred sizing of the stacks of decoy foils 56 within each canister 24 and preloading thereof by the separator plates 60 and end closure 80 causes the decoy foils to be evenly and uniformly dispensed through the spring fingers 44 located at the aft end 28 of the canister 24.

The typical preload applied to each stack of the decoy foils 56 by its corresponding separator plate 60 is approximately twenty pounds per square inch. Advantageously, the preferred size of each canister 24 makes it capable of holding a sufficient quantity of the decoy foils 56 to offer approximately five minutes of continuous protection. As shown in FIG. 1 and as described above, seven canisters 24 are installed within the interior of the housing 12 of the decoy pod 10. As indicated above, the drive screws 30 may be rotated by the drive motor 48 and intermediate transmission housing 46 one at a time. Alternatively, multiple canister drive screws may be rotated simultaneously. When all the decoy foils 56 have been dispensed from a particular canister 24, the sensor 52 detects the magnet 40 indicating all decoy foils 56 have been dispensed from that canister 24, and causing the control unit 50 to initiate the rotation of another drive screw 30 and thus the dispensation of the decoy foils 56 from within another canister 24. Thus, the decoy pod 10 as shown in FIG. 1 has the capability of offering thirty minutes of continuous protection for the aircraft from infrared guided missiles. As will be recognized, the bezel plate 18 serves to retain the canisters 24 in the pod 10. The bezel plate 18 must be moved to its open position prior to loading or unloading the canisters 24.

Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention.

What is claimed is:

1. A decoy pod comprising:

at least one canister defining a forward end and ah aft end;

an elongate, rotatable drive screw extending within the canister;

at least two stacks of decoy foils disposed within the canister; and at least one separator plate cooperatively engaged to the drive screw and operative to apply a preload to at least one of the stacks such that the separator plate is disposed between the stacks;

the rotation of the drive screw being operative to facilitate the dispensation of the decoy foils from the aft end of the canister.

2. The decoy pod of claim 1 comprising:

at least two stacks of decoy foils disposed within the canister;

the separator plate being disposed between the stacks and operative to apply the preload to at least one of the stacks.

3. The decoy pod of claim 2 comprising:

more than two stacks of decoy foils disposed -within the canister; and multiple separator plates cooperatively engaged to the drive screw;

each of the separator plates being disposed between an adjacent pair of the stacks and operative to apply the preload to a respective one of the stacks.

4. The decoy pod of claim 3 further comprising an end closure cooperatively engaged to the drive screw and operative to apply a preload to the stack disposed closest to the apt end of the canister.

5. The decoy pod of claim 4 further comprising:

at least two spring fingers cooperatively engaged to the canister at the aft end thereof;

the preload being applied to each of the stacks with a force not less than that required to dispense the decoy foils from the aft end of the canister through the spring fingers.

6. The decoy pod of claim 4 wherein the end closure includes a sealing member disposed in sealed -engagement with the canister.

7. The decoy pod of claim 3 further comprising;

a piston cooperatively engaged to the drive screw and disposed adjacent the forward end of the canister;

the stacks and separator plates being disposed between the piston and the aft end of the canister, with the rotation of the drive screw being operative to facilitate the movement of the piston along the drive screw toward the aft end of the canister and resultant dispensing of the decoy foils therefrom.

8. The decoy pod of claim 3 comprising seven canisters.

9. The decoy pod of claim 3 wherein each of the stacks is formed to have a height in the range of from about 0.5 inches to about 8.0 inches.

10. The decoy pod of claim 3 wherein:

the canister has a generally square cross-sectional configuration and defines a canister axis; and the drive screw extends along the canister axis.

11. The decoy pod of claim 3 wherein each of the separator plates has at least one hole formed therein which is sized and configured to allow each of the separator plates to be pushed over and along the drive screw without the need to rotate the drive screw.

12. The decoy pod of claim 11 wherein:
the drive screw includes a drive screw thread and has a root diameter; and
the hole is sized to have a diameter which is slightly smaller than the root diameter.

13. The decoy pod of claim 12 wherein each of the separator plates is fabricated from spring steel.

14. The decoy pod of claim 12 wherein each of the separator plates includes multiple slots extending radially from the hold thereof which are sized and configured to allow the hole to expand around and engage the drive screw when pushed thereover.

15. The decoy pod of claim 12 wherein each of the separator plates includes:
a pair of elongate primary slots extending in generally parallel relations to each other along opposed sides of the hole; and
a pair of secondary slots extending radially from the hole to respective ones of primary slots;
the primary and secondary slots being sized and configured to allow the hole to expand around and engage the drive screw when pushed thereover.

16. The decoy pod of claim 11 wherein the drive screw includes drive screw threads and the hole is internally threaded to threadably engage the drive screw threads by producing relative rotation between the drive screw and the separator plate.

* * * * *